United States Patent [19]

Duffield et al.

[11] 4,432,005

[45] Feb. 14, 1984

[54] INK CONTROL SYSTEM FOR INK JET PRINTER

[75] Inventors: Peter L. Duffield, Wayland, Mass.; Arthur L. Cleary, Derry, N.H.; Calvin M. Winey, III, Billerica, Mass.

[73] Assignee: Advanced Color Technology, Inc., Chelmsford, Mass.

[21] Appl. No.: 376,758

[22] Filed: May 10, 1982

[51] Int. Cl.$^{3}$ .............................................. G01D 15/18

[52] U.S. Cl. .................................................. 346/140 R

[58] Field of Search ............................ 346/75, 140, 1.1

[56] References Cited

U.S. PATENT DOCUMENTS 3,099,211 7/1963 Hilgoe et al. ........................ 346/140
3,930,258 12/1975 Dick et al. ............................ 346/75
4,027,762 6/1977 Nakauchi .............................. 346/75
4,320,406 3/1982 Heinzl .......................... 346/140 PD

FOREIGN PATENT DOCUMENTS 919484 2/1963 United Kingdom ................ 346/140

*Primary Examiner*—Donald A. Griffin
*Attorney, Agent, or Firm*—E. Thorpe Barrett

[57] ABSTRACT

The invention is embodied in a pressurized ink supply system for a three color ink jet printer. In order to provide a relatively large ink supply, three stationary primary ink reservoirs, formed as three long tubular sacks of flexible plastic film, contained in a pressurized disposable cartridge, are connected through flexible plastic umbilical tubes, and three solenoid-operated valves, to three secondary ink reservoirs mounted on the movable carriage of the print head. Automatic ink replenishment and an out-of-ink alarm are controlled entirely from the secondary ink reservoirs.

The ink level in each secondary reservoir is maintained within close limits without attention from the operator. When the primary reservoir runs out of ink, as indicated by failure of the secondary reservoir to fill within a specified time period, an alarm alerts the operator to remove and replace the ink cartridge. The pressure in the primary reservoirs forces the ink to the secondary reservoirs under automatic control, and under manual control for purging the ink passages by momentarily opening all of the solenoid valves.

Each secondary reservoir is provided with a rigid tub-like bottom covered by a thin flexible dome. An optical sensor is provided in each secondary reservoir that detects the level of ink in the reservoir. This sensor activates one of the solenoid valves to allow ink to flow into the appropriate secondary reservoir. If the secondary reservoir has not been filled within the normal fill time, a signal alerts the operator that the primary ink reservoir is empty and the ink cartridge should be replaced.

2 Claims, 14 Drawing Figures

INK CONTROL SYSTEM FOR INK JET PRINTER

FIELD OF THE INVENTION

This invention relates to ink jet printers of the type in which ink is ejected in droplets from a moving head to form a desired pattern. More particularly this invention relates to an improved ink supply system for a multicolor ink jet printer.

DESCRIPTION OF THE PRIOR ART

Many kinds of ink supply arrangements have been proposed, but only a few of these have proved sufficiently practical for production applications. Moreover, even those systems in current use are subject to operational difficulties, problems which are magnified in a multi-color printing system. The requirements for a practical multi-color ink jet printer are exacting.

A manually operable system for purging must be provided to remove any air bubbles or contamination from the ink passages or orifices. To operate properly, an ink jet must normally be primed with clean bubble-free ink. Because the orifices are small, even tiny bits of foreign matter can plug the orifice or an ink passageway or otherwise interfere with proper operation. In an impulse ink jet system, because ink droplet ejection results from the application of a pressure pulse to the ink, air bubbles adversely affect operation by the absorption of part of the pressure pulse and interfering with the proper ejection of a droplet. Even after initial priming, an impulse ink jet may draw in an air bubble through the orifice and require purging before satisfactory operation can be resumed. This purging results in waste ink that must be removed in such manner that it does not interfere with the functions of the inking system. Various proposals have been made for accomplishing these objectives, but none has resulted in a practical overall system suitable for a multi-color printer of the kind described here. The problem is more difficult of solution if a larger volume of each ink color is to be provided.

Various purging systems are known in the prior art. U.S. Pat. No. 4,123,761 to Kimura et al. shows a single-color system in which a reserve ink supply is maintained under pressure and when a purge valve is opened the ink is forced through the passages to remove any bubbles and impurities. A suction system is operated during the purging operation to remove waste ink and return it to a chamber surrounding the ink supply reservoir, U.S. Pat. No. 4,038,667 to Hou et al. shows a somewhat similar purging system in which a separate ink reservoir is maintained under pressure for the sole purpose of purging the ink channels. U.S. Pat. No. 4,148,041 to Rosenstock describes a system in which an isoparaffin solvent, immiscible with the ink, is used for flushing rather than the ink supply itself. The excess flushing liquid returns by gravity flow to a wick-filled chamber adjacent the ink reservoir.

In a system in which the ink reservoir is mounted on the printing head and moves with it, the volume of ink in the movable reservoir must be limited so that the total mass of the moving assembly is maintained within a tolerable limit. In addition, the carriage mounted reservoir must maintain a reasonably constant hydrostatic pressure at the printing orifices, for example, between 1 and 3 centimeters below atmospheric. This limitation requires that the ink reservoir be relatively shallow and the resulting lateral dimensions limit the capacity of the reservoir that can be carried. Other requirements include a jet feed system capable of delivering ink, with a viscosity of 20 centipoise, at a rate of at least 0.5 cubic centimeters per minute, for each color, without significant viscous pressure loss. The ink in the system must at all times be prevented from contact with the air. It is highly desirable that the ink be provided in a low-cost easily replaceable cartridge with an automatic signal to indicate when the ink supply is low.

In order for a multi-color jet printer using three differently colored inks to operate for an acceptable period without replenishing the ink supply, particularly when the printer is used to produce graphic images, an ink capacity of at least 50 cubic centimeters is required and a capacity of the order of 100 cubic centimeters is much to be preferred. Attempting to mount ink containers of this size on the moving carriage creates a number of problems. The increased mass that must be carried by the printing mechanism results in either slower response to carriage control signals or a requirement for a more powerful drive system. The change in level of the ink between full and empty positions must be limited to some 4 or 5 millimeters. This requires that each ink reservoir cover a substantial area that is cumbersome to carry on the moving carriage and severly limits the capacities of the ink reservoirs. Furthermore, the large area of the reservoirs would require the printer to be precisely level for proper operation.

One method of purging an ink jet printer, for example, of the type described in U.S. Pat. No. 4,126,868 to Kirner, is to apply pressure to the flexible cap of the ink reservoir to force a flow of ink through the passages and orifice. With an ink reservoir of larger area, however, the force required to achieve purging by this method becomes excessive. Such a reservoir is usually made by sealing a flexible diaphragm or cap around its periphery to the edge of a tub-shaped base. This sealing operation becomes more difficult in production with large capacities and is particularly difficult, with the likelihood of leaks, if the reservoirs are relatively long and slender.

If the rigid bottom is omitted and instead the reservoir is in the form of a tubular sack formed entirely of a thin plastic film, new problems arise. The sack must be very flexible so that it collapses readily as the ink is withdrawn. If the plastic is too stiff, the ink is not withdrawn and air is drawn into the system through the jet orifices. The combination of the requisite strength and easy collapsibility is difficult to achieve. The problem is compounded by cost factors because, for purposes of convenience, the ink cartridge must be disposable and therefore modest in cost.

U.S. Pat. No. 4,202,267 to Heinzl et al. describes an ink reservoir having a rigid base covered by a collapsible rubber dome in which a monitoring device that detects the absence of ink in the container by monitoring the resistance of the ink. Such a system is affected, however, by changes in the resistance of the ink, whether by reason of changes in temperature, viscosity, composition or other factor, and a three-electrode bridge measuring system, such as that described by Kern in U.S. Pat. No. 4,196,625, is much to be preferred. The latter system does, however, require three electrodes in the ink reservoir. For a three-color ink system, nine electrodes would be required.

U.S. Pat. No. 4,178,595 to Jinnai et al. describes an ink supply system in which a primary ink reservoir feeds a smaller reservoir carried by the moving head. At the end of a printing line, a sensor determines whether the ink supply in the small reservoir is low. If ink is needed, the printing head is moved to bring the smaller ink reservoir into mechanical engagement with the larger reservoir so that the smaller reservoir is replenished. The ink supply in the smaller reservoir is again sensed and if found to be low, a signal is provided to indicate the larger reservoir is empty. U.S. Pat. No. 4,183,031 to Kyser et al. uses a pressure-responsive sensor to detect when the ink supply is low. Still other arrangements of ink supply systems are shown in U.S. Pat. Nos. 4,204,215 to Nakara; 4,184,167 to Vandervalk; 4,126,868 to Kirner; and 4,149,172 to Heinzl.

SUMMARY OF THE INVENTION

The invention is embodied in a pressurized ink supply system for a three color ink jet printer. In order to provide a relatively large ink supply, three stationary primary ink reservoirs are connected by flexible plastic umbilical tubes to three secondary ink reservoirs mounted on the carriage and move with the print head across the sheet being printed.

The three primary reservoirs comprise relatively long tubular sacks of flexible plastic housed in a closed container that is kept under continuous pressure. If the ink level were to be measured by the change in resistance using the general method described by Kern in U.S. Pat. No. 4,196,625 it would be necessary to provide for three electrodes within the ink reservoir. This is best accomplished by providing a rigid plastic trough as the bottom portion of each reservoir and to weld a flexible collapsible cap to the periphery of the trough. The three electrodes can then be formed integrally with the rigid bottom. However, the welding of the flexible plastic to such a long base is difficult and unreliable in production quantities. A lower cost and more practical solution is to form the primary reservoirs entirely of flexible plastic. This solution, however, creates new problems in that the three electrodes cannot be formed as an integral part of the flexible sack. To insert three electrode needles through each of the three ink sacks at the time of installation of each cartridge requires substantial force with the possibility of rupturing the sack or otherwise causing leakage of the ink. In accordance with this invention, the automatic ink replenishment and the out-of-ink alarm are controlled entirely from the secondary ink reservoirs.

The ink level in each secondary reservoir is maintained within close limits without attention from the operator. When the primary reservoir runs out of ink, an alarm alerts the operator to remove and replace the ink cartridge. The pressure in the primary reservoirs is utilized for carrying the ink to the secondary reservoirs under automatic control, and under manual control for purging the ink passages by momentarily opening the passageways between the primary reservoirs and the secondary reservoirs for a period sufficient to allow the pressure in the secondary reservoirs to equal the pressure in the primary reservoirs and force the ink through the orifices. The waste ink that is discharged by this purging operation is captured and returned to a separate compartment in a disposable cartridge that houses the three primary ink reservoirs. This waste receiving chamber is maintained under a slight vacuum by the same pump that provides the pressure for the ink reservoirs.

Each secondary reservoir is provided with a rigid tub-like bottom covered by a thin flexible dome. As ink is withdrawn from the secondary reservoir, by demands from the print head, the flexible domes collapse. The domes are allowed to collapse only a certain predetermined distance before a position sensing device, such as an optical sensor located above each of the flexible domes, activates an automatic mechanism to allow ink to flow from the primary reservoir into the secondary. The flow of ink is stopped before the flexible dome is fully expanded to prevent over-pressurization of the secondary reservoir. The distance traveled by the top of the dome in each fill cycle is determined by the hysteresis of the position detector and the automatic valve.

This same level detection system in the secondary reservoir can also be used to sense an ink-out condition in the primary reservoir and thus avoid the difficult problem of penetrating each of the three ink sacks with three electrode needles. When the position sensor in the secondary reservoir calls for ink, a timer is activated. If the sensor has not been satisfied within a predetermined time interval, an ink-out condition is activated and the operator is alerted that the primary ink cartridge must be replaced.

DESCRIPTION OF THE PREFERRED EMBODIMENT

Figure 1:
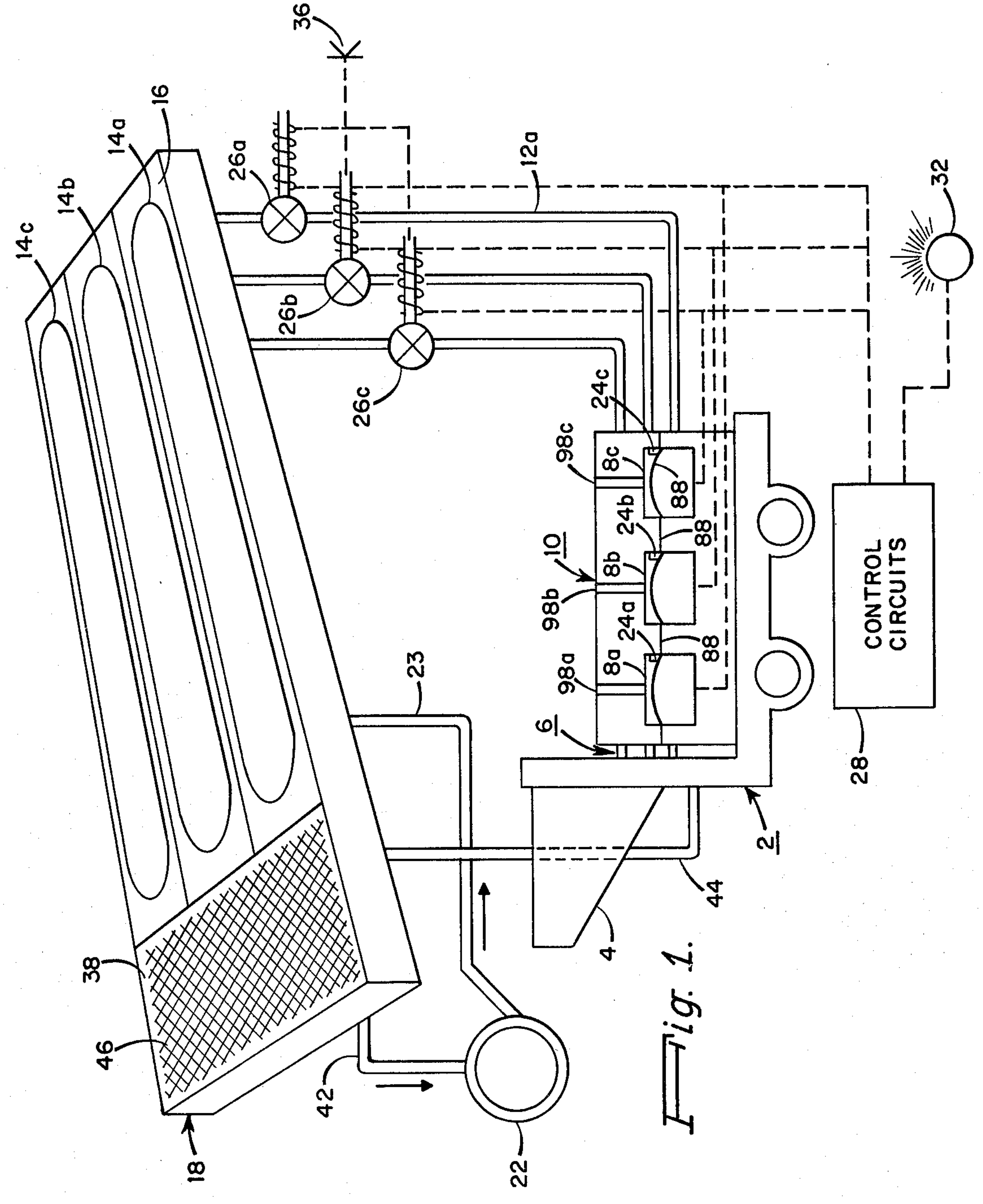
FIG. 1 is a diagrammatic illustration showing the principal components of the ink supply system embodying the invention.

As shown in FIG. 1, a movable carriage assembly, generally indicated at 2, supports a printing head 4 having multiple ink jet orifices (not shown) that are connected by ink supply tubes, indicated diagrammatically at 6, to three secondary ink reservoirs *8a*, *8b*, and *8c* for the three colors of ink. The secondary ink reservoir *8a* is connected by a flexible plastic umbilical tube *12a* to a supply reservoir comprising a flexible ink sack *14a* positioned in a compartment 16 of a rigid plastic housing 18 that forms a replaceable ink cartridge. The compartment 16 is maintained under constant pressure, for example between 3 and 7 pounds per square inch, by an air pump 22. The pump is conventional and of a type readily available commercially. The compartment 16 also contains two additional containers 14*b* and 14*c* for the other colors of ink.

In operation, the ink from each of the three secondary reservoirs is fed to the orifices under impulses generated by piezoelectric means in the usual manner that is well known in the art. The secondary reservoirs are small in size so that minimum mass is required to be carried by the moving carriage assembly 2. It is important that the level of ink in the secondary reservoirs be maintained within relatively close limits so that the hydrostatic pressure at the orifices is within practical operating limits, for example, between 1 and 3 centimeters below atmospheric, with no substantial disparity between the three colors of ink.

The small size of the secondary reservoirs 8*a*, 8*b* and 8*c* require they be replenished often from the respective primary reservoirs 14*a*, 14*b* and 14*c*. A sensor unit, generally indicated at 24*a*, 24*b* and 24*c*, is incorporated in each of the secondary reservoirs and when the ink in any secondary reservoir drops below a predetermined level, an appropriate solenoid-operated valve of those indicated generally at 26*a*, 26*b* and 26*c* is opened and allows ink to flow through the valve into the secondary reservoir until the level sensor indicates the reservoir has been filled to the desired height.

Actuation of the solenoid valve 26*a* also starts a timer circuit in a central processor unit, indicated diagrammatically at 28. If the sensor 24*a* fails to indicate within some predetermined period of time that the reservoir 8*a* has been filled, a signal light 32 is lit to indicate to the operator that the ink in the primary sack 14*a* is low and the disposable ink cartridge 18 is to be replaced. This filling operation occurs only at the end of a line, when the printing head is inactive, and requires only a fraction of a second to transfer the required amount of ink. The control circuits 28 include software that prevents activation of the solenoid valves 26*a*, 26*b* and 26*c* when the printing head is moving.

To purge the system and remove any air bubbles or contaminating particles, a manual switch 36 is provided that simultaneously energizes each of the solenoid valves 26*a*, 26*b* and 26*c* and permits the flow of ink into the three secondary reservoirs 8*a*, 8*b*, and 8*c* so that these reservoirs assume the same pressure as the primary chamber 16 forcing ink from the secondary reservoirs and flushing the ink passages and the orifices.

This flushing operation results in waste ink that must be collected and disposed of. Dimensional constraints in the carriage assembly that must carry a number of ink reservoirs, makes it impractical to collect the waste ink in the carriage assembly. Moreover, it is advantageous to dispose of the waste ink automatically each time the ink cartridge 18 is replaced. To this end, a separate sealed chamber 38 is provided in the cartridge 18 and is connected by a flexible tube 42 to the input side of the air pump 22. Another such tube 44 connects the chamber 38 to a conventional collection trough (not shown) that receives the waste ink from the printing head 4. The pump 22 maintains a slight suction in the chamber 38 so that waste ink is sucked into the chamber 38. A wick 46 of absorbent material may be placed in the chamber 38 to absorb the waste ink. The waste ink is thus disposed of each time the cartridge 18 is replaced.

In FIG. 1, the electrical connections are illustrated diagrammatically by broken lines. Details of the electrical circuits are not shown here since the necessary circuitry will be apparent to those skilled in the art.

Figure 2:
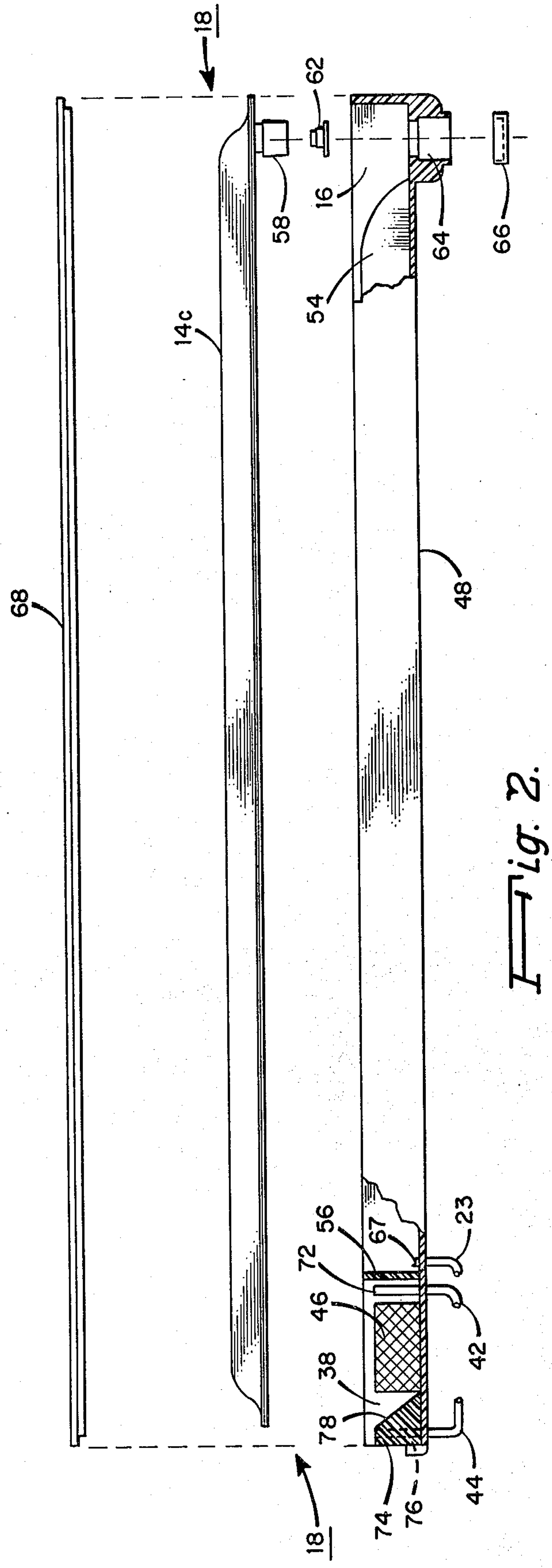
FIG. 2 is a side view of the primary reservoir showing the principal components prior to assembly.
Figure 3:
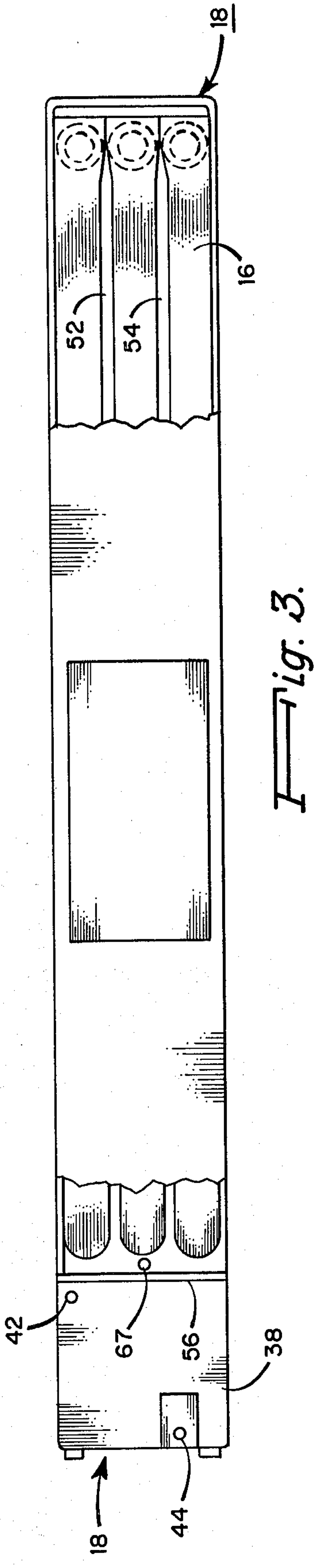
FIG. 3 is a top view of the primary ink reservoir with portions of the cover cut away.

The construction of the ink cartridge is shown in more detail in FIGS. 2 and 3. A bottom tray 48 has two dividers 52 and 54, terminated at one end by a partition 56, that form three longitudinal compartments within the chamber 16.

The construction of the ink sack 14*c* shown in FIG. 2 is typical of each of the three sacks. The sack may be formed of two strips of thin flexible plastic heat sealed along the edges. The sack 14*c* may, for example, be approximately 15 inches in length and of such cross section as to provide a capacity for about 100 cubic centimeters of ink. Near one end of the sack, a rigid plastic collar 58 is sealed to the outer surface of one wall of the sack. A soft rubber plug 62 is press-fitted into the collar 58 and forms an ink-tight seal. The ink sack is filled, for example, with ink at the opposite end from the collar 58 before that end of the sack is sealed. The sack filled with ink is then placed in one of the longitudinal cavities of the chamber 16 with the collar 58 extending into a well 64 formed on the underside of the tray 48. The well 64 is sealed at its lower end by a plastic cap 66. To permit pressurizing the compartment 16, an opening 67 is provided in the floor of the tray 48. This opening is sealed until the time of installation.

After the three primary ink reservoir sacks 14*a*, 14*b* and 14*c* have been placed in the tray 48, a flanged cover 68 is secured to the top of the tray and sealed tightly around its periphery and along the top edge of the partition 56 so that the chamber 16 is completely sealed from the outside air and from the waste ink in the chamber 38. The cartridge 18 may thus be shipped and handled without danger of ink spillage even if one of the ink sacks should be ruptured.

The chamber 38, which is also completely sealed by the cover 68, contains a standpipe 72 that is connected through an opening in the bottom of the tray to the suction tubing 42. A plastic abutment 74, formed integrally with the tray 48, has a vertical bore 76 that is arranged for connection, by any suitable means, to the waste ink tube 44. The waste ink enters the compartment 38 through the bore 76 and runs down a sloping face 78 to be absorbed by the wick 46 which may substantially fill the chamber 38.

Figure 4:
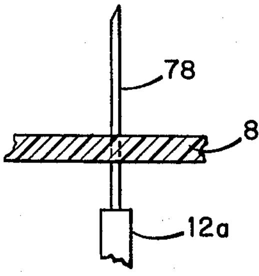
FIG. 4 shows one of the hollow sharpened needles by which connection is made to the disposable primary ink cartridge.

When the ink cartridge 18 is to be installed in the printer, it is placed on a receiving structure (not shown) and forced downwardly into position. To provide a convenient ink connection to the sacks 14*a*, 14*b* and 14*c*, three hollow sharpened needles, only one of which is shown at 78 in FIG. 4, are mounted in a base 82 that forms a rigid part of the receiving structure. The lower end of each hollow needle 78 is connected to the appropriate ink supply tube 12*a*, 12*b* or 12*c*. When the cartridge 18 is pushed down onto the needles 78, the sharpened end of each needle penetrates, in succession, the cap 66, the rubber plug 62 and the wall of the corresponding ink sack 14*a*, 14*b*, or 14*c*. Connections are then made, by any suitable means (not shown), to the flexible tubes 23, 42 and 44. The cartridge is now completely connected and provides a source of a substantial quantity of each of the three colors of ink.

Figure 5:
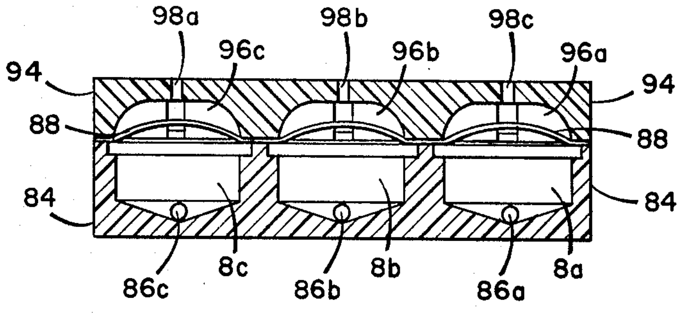
FIG. 5 is an enlarged vertical sectional view of the secondary ink reservoir.
Figure 6:
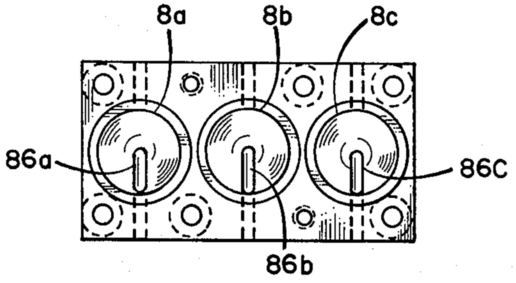
FIG. 6 is a top view of the lower part of the secondary ink reservoir.
Figure 7:
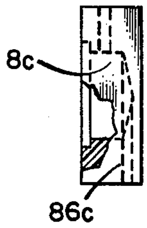
FIG. 7 is an end view of the reservoir shown in FIG. 6.
Figure 8:
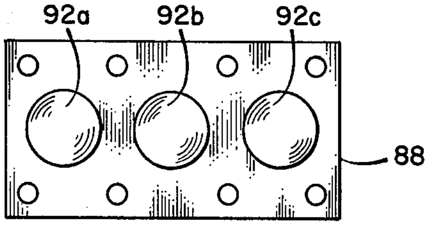
FIG. 8 is a top view of the flexible diaphragm of the secondary ink reservoir.
Figure 9:
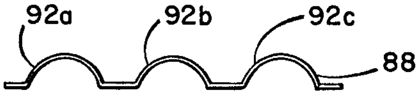
FIG. 9 is a side view of the diaphragm shown in FIG. 8.
Figure 10:
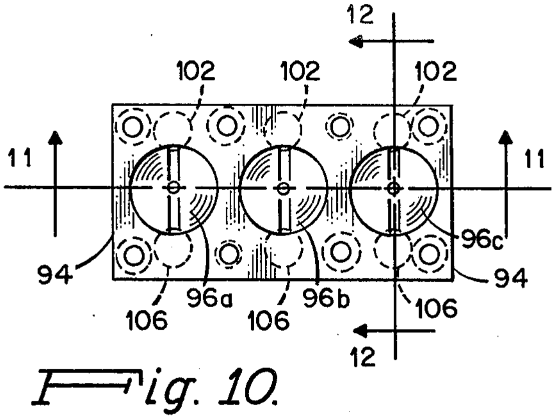
FIG. 10 is a bottom view of the cap of the secondary ink reservoir.
Figure 12:
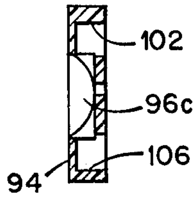
FIG. 12 is a section along line 12—12 of FIG. 10.
Figure 11:
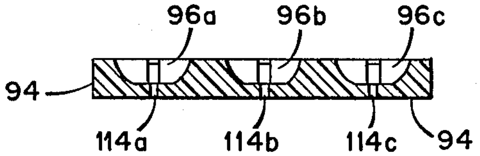
FIG. 11 is a section along line 11—11 of FIG. 10.

FIGS. 5–14 show details of the secondary reservoir cartridge 10. A base 84 comprises a plastic block containing bottom cavity sections of the three secondary reservoirs 8*a*, 8*b* and 8*c* (FIGS. 6 and 7). Three holes 86*a*, 86*b* and 86*c* extend laterally from the lowest points of the rounded bottoms of the reservoirs for connection to the appropriate orifices in the printing head 4. Positioned directly on top of the base 84 is a thin flexible diaphragm 88 (FIGS. 8 and 9) formed, for example, from one mil opaque polyethylene and having three domes 92*a*, 92*b* and 92*c*.

A cover 94 (FIGS. 10–12), positioned directly on top of the diaphragm 88, is formed from a rigid block of plastic and contains three dome sections 96*a*, 96*b* and 96*c* dimensioned to receive the diaphragm domes 92*a*, 92*b* and 92*c*. The cover 94 has three small vent holes 98*a*, 98*b* and 98*c* extending from the dome cavity to the top of the cover.

Figure 13:
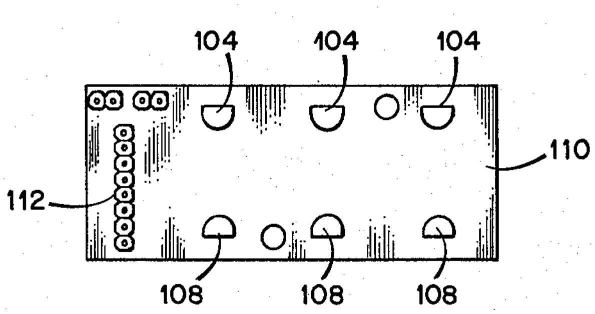
FIG. 13 is a bottom view of the printed circuit board mounting for the ink sensors.
Figure 14:
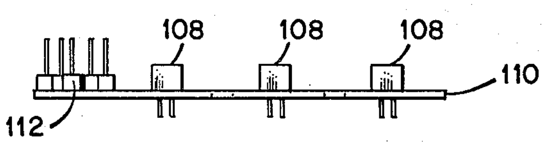
FIG. 14 is a side view of the board shown in FIG. 13.

On opposite sides of each cover dome cavity there is a vertical hole 102 that extends from the top of the cover part way through and opens into the dome in the area of its maximum diameter. These openings are provided to receive the optical illuminators 104 (FIGS. 13 and 14). A similar hole 106 on the opposite side of each dome 96 receives the corresponding sensor 108.

A printed circuit board 110 serves as a mounting for the three infrared illuminators 104 and the three sensors 108. The connector terminals 112 are appropriately connected to the sensors and illuminators by printed circuit leads (not shown) and are in turn connected to the appropriate control circuits.

Each of the illuminators 104 is positioned in one of the openings 102 and in line with one of the sensors 108 positioned in the opposite hole 106. As best illustrated by FIG. 5, when the reservoirs 8*a*, 8*b* and 8*c* are filled with ink, each of the diaphragm domes 92*a*, 92*b* and 92*c* is forced upwardly into the corresponding dome section 96*a*, 96*b* or 96*c*. Free movement of the diaphragms into and from the cover is assured by the three vent holes 98*a*, 98*b* and 98*c*. When the diaphragm 88, which may be opaque, is forced upwardly into the cover 94, either the diaphragm 88 or the colored ink interrupts the infrared beam between each illuminator and its corresponding sensor.

When the ink in any one of the secondary reservoirs drops to such a level that the beam from its illuminator 104 strikes the corresponding sensor 108, a signal to the central processor unit 28 actuates the appropriate valve 26*a*, 26*b* or 26*c* to fill the secondary reservoir. The solenoid valve remains open either until the infrared control beam is again interrupted or the timing circuit in the central processor 28 energizes the signal lamp 32 to indicate that the ink cartridge 18 should be replaced.

From the foregoing it will be apparent the multi-color ink system described herein is well adapted to meet the ends and objects herein set forth, that it is capable of economic manufacture in production quantities, and is subject to a variety of modifications within the scope of the following claims.

We claim:

1. In an ink jet printer having a printing head and a movable carriage carrying said printing head, an ink supply system comprising a primary ink cartridge having an enclosed supply chamber, a flexible ink reservoir enclosed in said chamber, a secondary ink container on said carriage having therein an ink-receiving reservoir comprising a dome-shaped receptacle, a flexible diaphragm having a dome shaped portion dividing said receptacle into upper and lower cavities and arranged to nest within said upper cavity, said lower cavity being being connected to said ink supply conduit, means including a flexible ink-supply conduit for transferring ink from said ink reservoir of said primary ink cartridge to said ink-receiving reservoir of said secondary ink container, a venting passageway communicating with said upper cavity, and pump means connected to said chamber operative to maintain said chamber under continuous gaseous pressure.

2. In a multi-color ink jet printer having a printing head and a movable carriage carrying said printing head, an ink supply system comprising a primary ink cartridge having an enclosed supply chamber, a plurality of flexible ink reservoirs enclosed in said chamber, a secondary ink container on said carriage having therein a plurality of ink-receiving resevoirs each comprising a dome-shaped receptacle, means including a plurality of flexible ink-supply conduits for transferring ink from each of said ink reservoirs of said primary ink cartridge to one of said ink-receiving reservoirs of said secondary ink container, a flexible diaphragm having a plurality of dome-shaped portions dividing each of said receptacles into upper and lower cavities and arranged to nest within one of said upper cavities, each of said lower cavities being connected to said ink-supply conduit, venting means communicating with each of said upper cavities, and pump means connected to said chamber operative to maintain said chamber under continuous gaseous pressure.

* * * * *